(12) United States Patent  
Eshita

(10) Patent No.: US 9,326,120 B2  
(45) Date of Patent: Apr. 26, 2016

(54) COMMUNICATION APPARATUS AND COMMUNICATION CONTROL METHOD

(75) Inventor: Shiro Eshita, Tokyo (JP)

(73) Assignee: SONY CORPORATION, Tokyo (JP)

( * ) Notice: Subject to any disclaimer, the term of this patent is extended or adjusted under 35 U.S.C. 154(b) by 37 days.

(21) Appl. No.: 14/125,474

(22) PCT Filed: Jun. 11, 2012

(86) PCT No.: PCT/JP2012/064917  
§ 371 (c)(1),  
(2), (4) Date: Dec. 11, 2013

(87) PCT Pub. No.: WO2013/008572  
PCT Pub. Date: Jan. 17, 2013

(65) Prior Publication Data  
US 2014/0113566 A1     Apr. 24, 2014

(30) Foreign Application Priority Data  
Jul. 11, 2011   (JP) .................................. 2011-152746

(51) Int. Cl.  
*H04B 7/00* (2006.01)  
*H04W 8/00* (2009.01)  
*H04W 52/02* (2009.01)  
*H04W 4/00* (2009.01)

(52) U.S. Cl.  
CPC .............. *H04W 8/005* (2013.01); *H04W 4/008* (2013.01); *H04W 52/0254* (2013.01); *Y02B 60/50* (2013.01)

(58) Field of Classification Search  
CPC .. H04W 52/0254; H04W 8/005; H04W 4/008  
USPC ....................... 455/41.1, 41.2, 41.3  
See application file for complete search history.

(56) References Cited

U.S. PATENT DOCUMENTS

| 8,391,786 | B2 * | 3/2013 | Hodges et al. | 455/41.2 |
| 2011/0022755 | A1 * | 1/2011 | Sueyoshi et al. | 710/109 |
| 2011/0171909 | A1 * | 7/2011 | Jung et al. | 455/41.2 |
| 2012/0202423 | A1 * | 8/2012 | Tiedemann et al. | 455/41.1 |
| 2012/0289157 | A1 * | 11/2012 | Palin et al. | 455/41.2 |

FOREIGN PATENT DOCUMENTS

| JP | 2008-154004 | | 7/2008 |
| JP | 2010-68494 | | 3/2010 |
| JP | 2010068494 A | * | 3/2010 |
| JP | 2010-199918 | | 9/2010 |
| JP | 2011-29892 | | 2/2011 |

OTHER PUBLICATIONS

International Search Report issued Aug. 7, 2012 in PCT/JP2012/064917.

\* cited by examiner

*Primary Examiner* — Ping Hsieh  
(74) *Attorney, Agent, or Firm* — Hazuki International, LLC

(57) ABSTRACT

Provided is a communication apparatus including a short-range wireless communication unit that performs short-range wireless communication with an external communication device, an acceleration sensor that detects an acceleration by a movement of a chassis, and a control unit that estimates whether the chassis approaches the external communication device, from acceleration variation information recognized by an acceleration detection signal from the acceleration sensor, performs a communication opportunity determination using a result of the estimation, controls the short-range wireless communication unit to generate a standby radio wave in a dense state in a case where a communication opportunity is determined, and controls generation of the standby radio wave by the short-range wireless communication unit to be in a rough state or a stopped state in a case other than the case of determining the communication opportunity.

6 Claims, 14 Drawing Sheets

FIG. 1
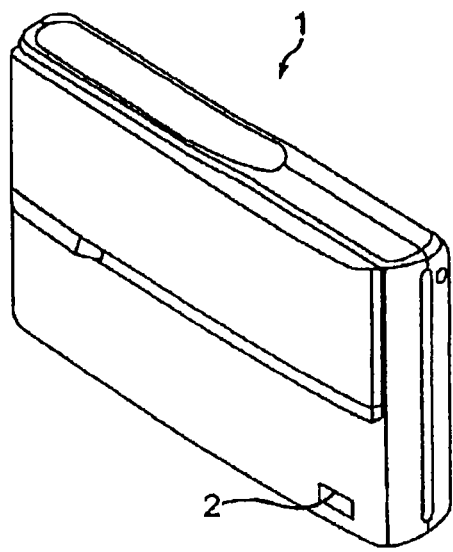
A
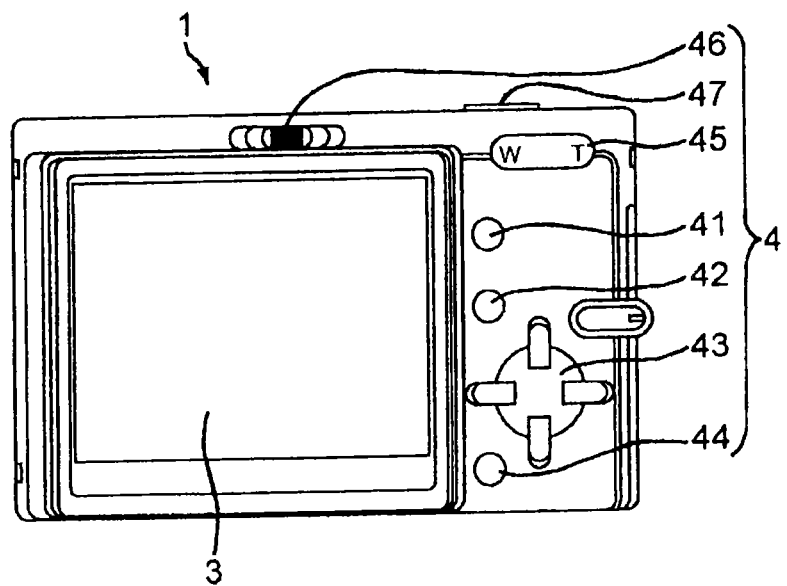
B

FIG. 6
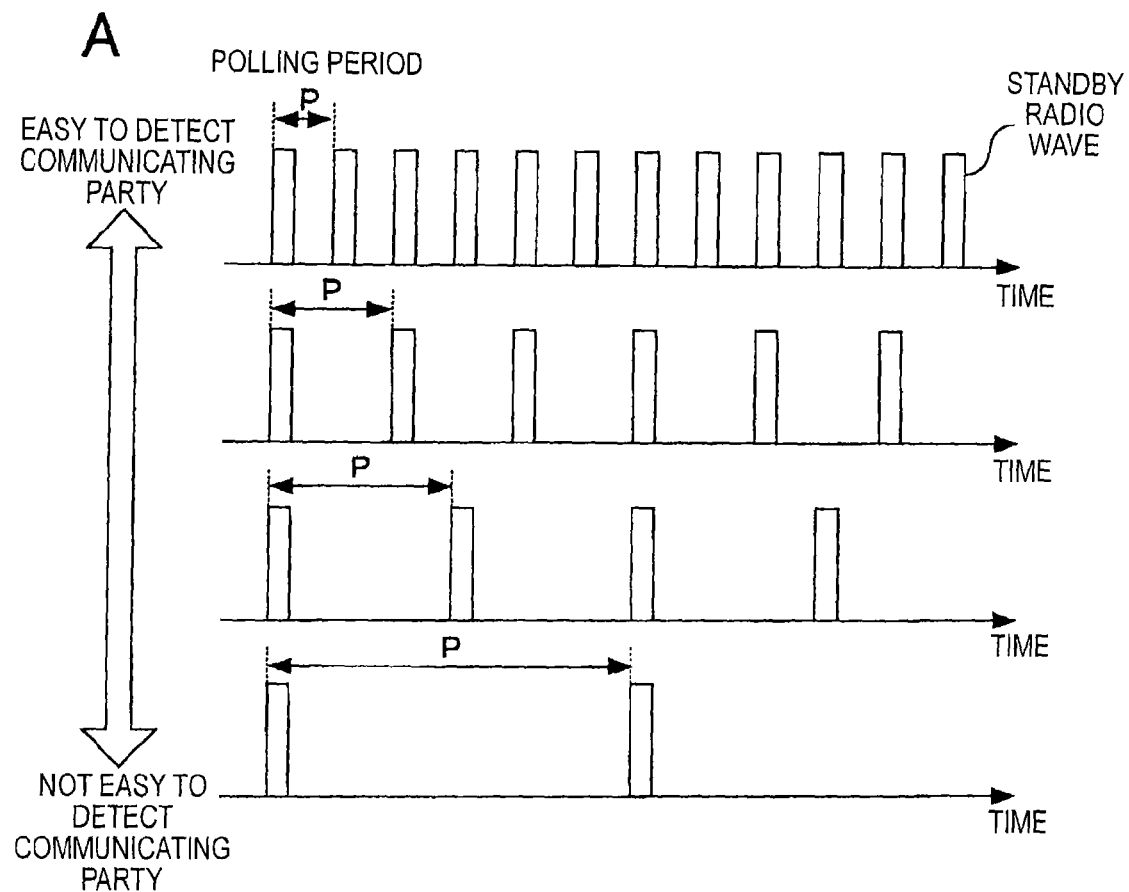
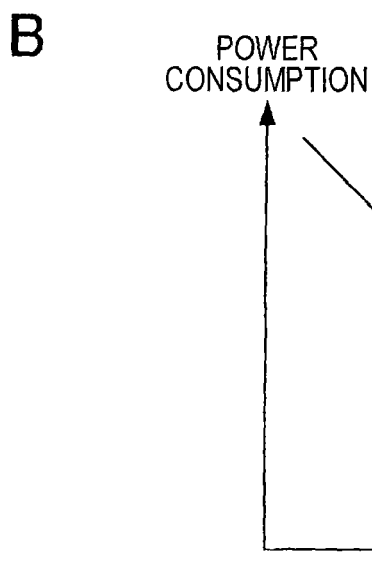

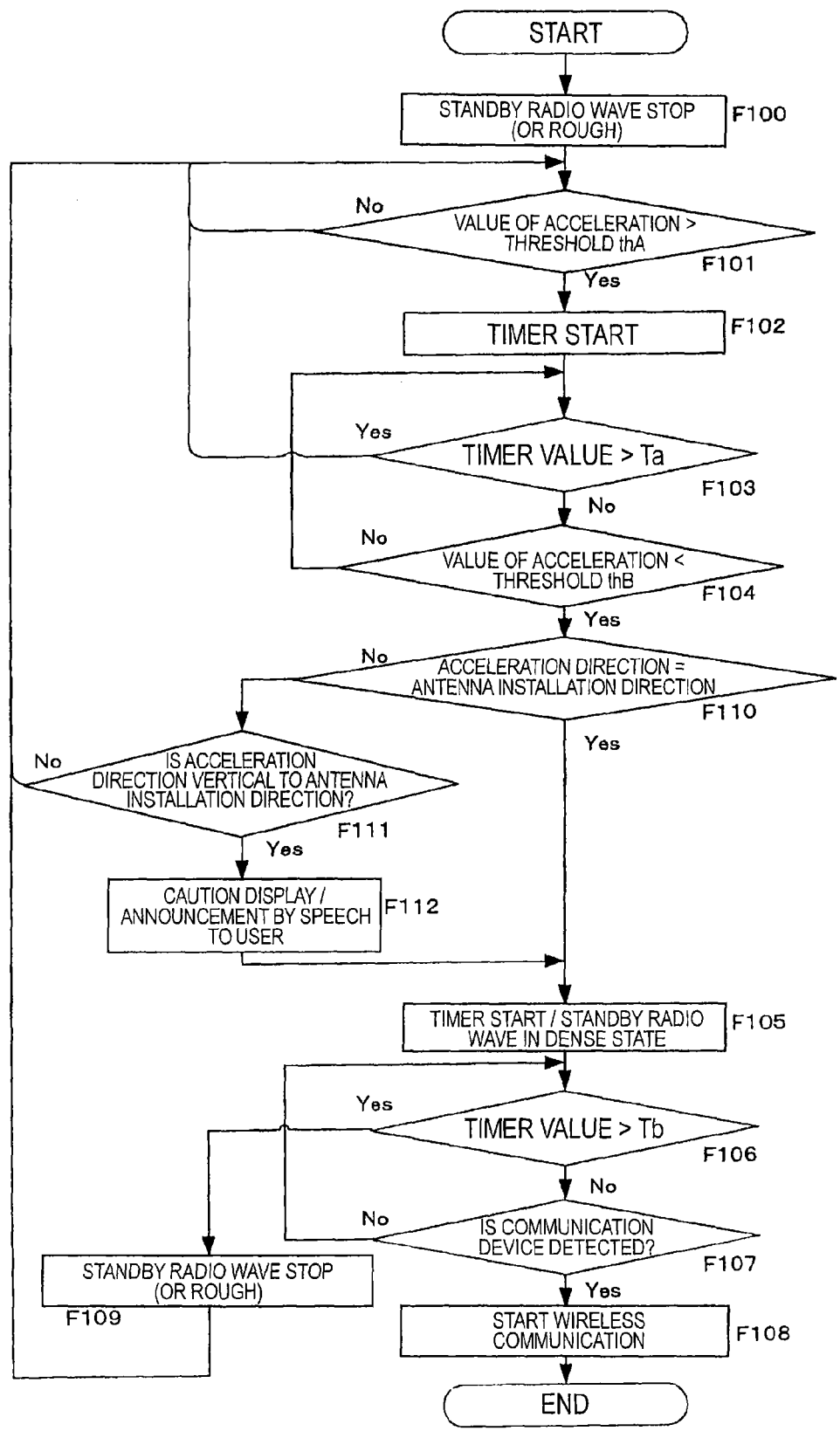

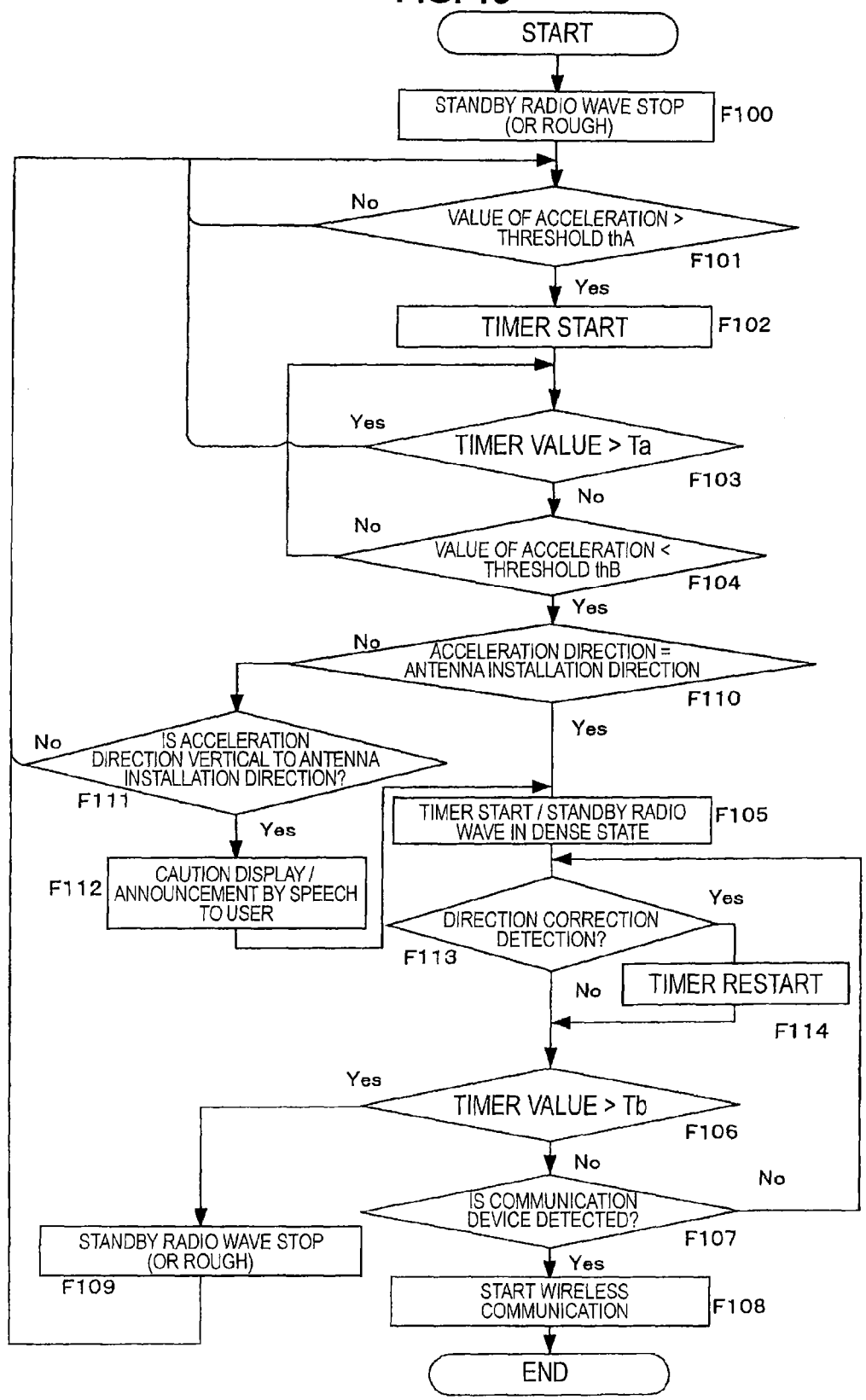

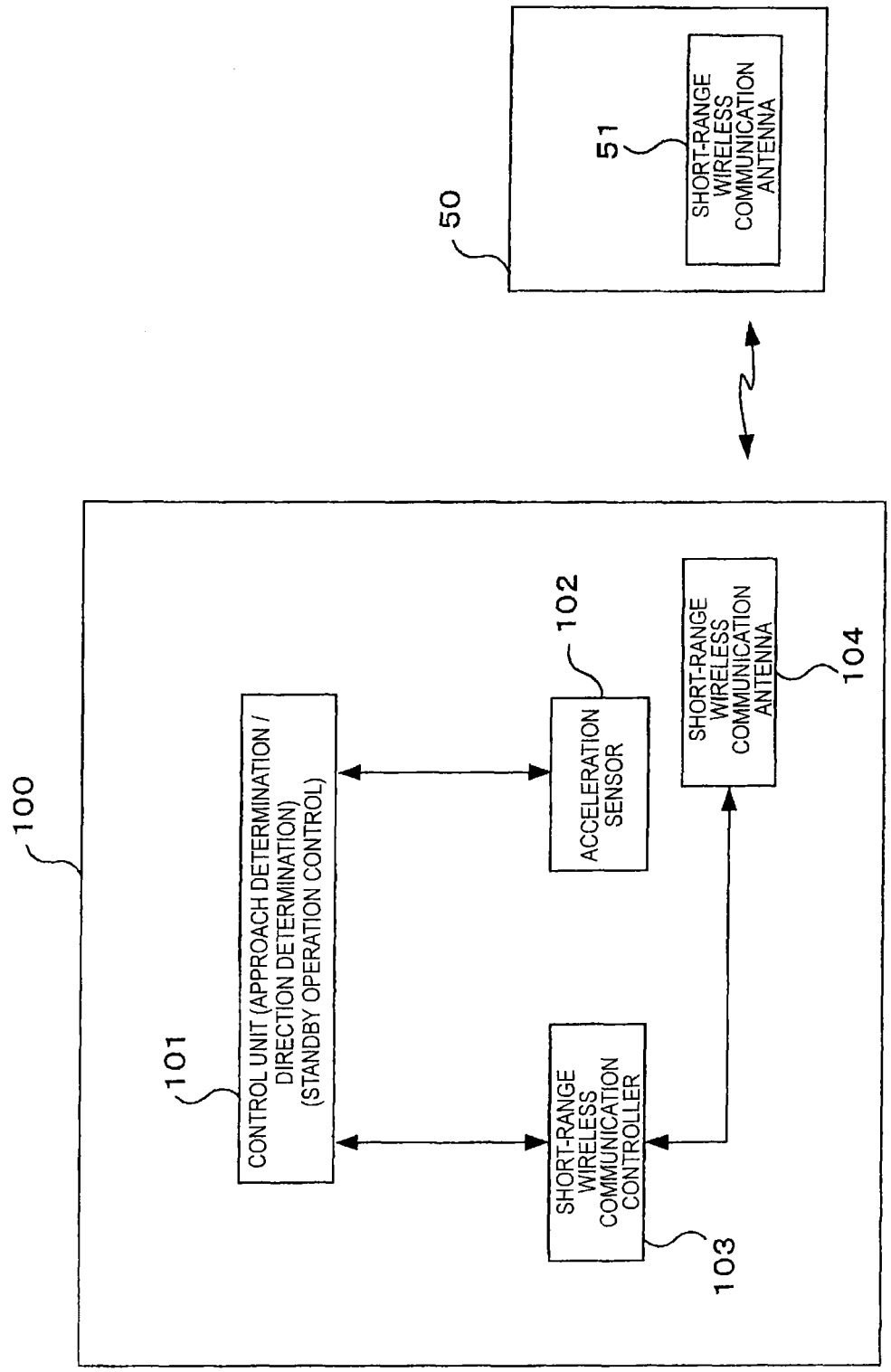

COMMUNICATION APPARATUS AND COMMUNICATION CONTROL METHOD

TECHNICAL FIELD

The present disclosure relates to a communication apparatus and communication control method that performs a short-range wireless communication.

BACKGROUND ART

A short-range wireless communication technology such as Bluetooth or TransferJet has been known in this field. In the short-range wireless communication, transmission of a radio signal for detection is used in order to detect a communication counterpart capable of wireless communication.

Patent Literature 1 discloses TransferJet as an example of the short-range wireless communication. As described in Patent Literature 1, a radio signal for detecting an opposite communication device is defined as a polling signal, and one communication device sends a polling signal and the other communication device replies a response signal according to the polling signal. The polling signal allows preparation condition when both communication devices initiate a data exchange between them to be decided and also enables processes performed between them to be synchronized. Moreover, the polling signal is discontinuously sent at a given polling interval.

Thus, in the short-range wireless communication, a radio signal for detecting an opposite communication device (referred to herein as "standby radio signal") is periodically transmitted. This periodic transmission of the radio signal is used to automatically detect an opposite communication device and then initiates the communication by bring an originator communication device and the target communication device into close proximity, thereby realizing an intuitive operation feel, particularly in the short-range wireless communication.

CITATION LIST

Patent Literature

Patent Literature 1: JP 2011-29892A
Patent Literature 2: JP 2011-199918A
Patent Literature 3: JP 2008-154004A

SUMMARY OF INVENTION

Technical Problem

By the way, in a detection scheme of a communicating party, there are the following problems.

First, in the above-mentioned detection scheme, although the communicating party is automatically detected by approaching to the communicating party and the user's convenience is improved by starting communication, by contrast, in a case where the user has no intention to perform wireless communication while the communicating party is detected by the presence of a short-range wireless communication device, communication is started against the user's intention.

When the communication is started regardless of the user's intention, it leads to an unintended data outflow and an increase of power consumption.

Secondarily, in the above-mentioned detection scheme, even in a case where the user has no intention to perform wireless communication, unnecessary power is consumed by regularly sending standby radio waves.

Here, as a method for suppressing power consumption by periodically sending a radio signal, there is the following example.

First, Patent Literature 2 describes a scheme in which acceleration detection means is installed in a wireless communication device and, in a case where the acceleration by user's action is detected, communication means is controlled. To be more specific, it is assumed that communication processing is operated in a case where the acceleration by user's walking or the like is detected by the acceleration detection means (for example, acceleration sensor), the communication processing is stopped in a case where the acceleration is not detected.

However, in the case of this technique, since the communication processing is started and stopped in response to a response of the acceleration sensor by the user's action, even in a case where the user has no intention to start communication, the communication is started when the wireless communication device detects the acceleration. For example, even in a case where the user carries the wireless communication device, it is considered that communication is started. As a result, there is a possibility that unintended communication is started and unnecessary power is consumed.

Moreover, Patent Literature 3 describes a scheme in which acceleration detection means is installed in a wireless communication device and a function to perform communication between communication devices is invoked using, as a trigger, detection of predetermined oscillation motion added to the close wireless communication devices. To be more specific, it is necessary to operate two steps that: first, the wireless communication devices are made adjacent to each other; and, furthermore, they are oscillated in a predetermined cycle like the users' shake hands, and a predetermined oscillation operation is detected in each communication device to start communication. In this technique, the user requests two kinds of operations to start communication, and, since the later operation is obviously a specific operation specialized in communication devices, the operation is performed after the user recognizes this beforehand. That is, the convenience of starting communication only by adjacency is impaired.

Therefore, it is an object of the present disclosure to maintain the user's convenience in devices that perform short-range wireless communication while preventing unnecessary communication, and reduce power required for connection standby.

Solution to Problem

According to the present disclosure, there is provided a communication apparatus including a short-range wireless communication unit that performs short-range wireless communication with an external communication device, an acceleration sensor that detects an acceleration by a movement of a chassis, and a control unit that estimates whether the chassis approaches the external communication device, from acceleration variation information recognized by an acceleration detection signal from the acceleration sensor, performs a communication opportunity determination using a result of the estimation, controls the short-range wireless communication unit to generate a standby radio wave in a dense state in a case where a communication opportunity is determined, and controls generation of the standby radio wave by the short-range wireless communication unit to be in a rough state or a stopped state in a case other than the case of determining the communication opportunity.

In a case where the short-range wireless communication unit is controlled to generate the standby radio wave in the dense state by the determination of the communication opportunity and a predetermined time passes without establishment of communication with the external communication device, the control unit controls the generation of the standby radio wave by the short-range wireless communication unit to be in the rough state or the stopped state.

According to the present disclosure, there is provided a communication control method of a communication apparatus including a short-range wireless communication unit that performs short-range wireless communication with an external communication device and an acceleration sensor that detects an acceleration by a movement of a chassis, the communication control method including estimating whether the chassis approaches the external communication device, from acceleration variation information recognized by an acceleration detection signal from the acceleration sensor, performing a communication opportunity determination using a result of the estimation, and generating a standby radio wave in a dense state from the short-range wireless communication unit in a case where a communication opportunity is determined, and setting generation of the standby radio wave by the short-range wireless communication unit to a rough state or a stopped state in a case other than the case of determining the communication opportunity.

In such the present disclosure, as acceleration variation information by an acceleration sensor according to the movement of a communication device chassis, whether the chassis is close to an external communication device is estimated and whether a communication opportunity is provided is determined. That is, a short-range state is determined by the acceleration variation observed when the user performs an operation of making the communication apparatus chassis approach the external communication device of the communicating party. By this means, a communication opportunity provided by user's intention is estimated at a relatively high accuracy, and, by keeping standby radio waves in a dense state according thereto, the communication start is prepared.

On the other hand, by keeping the standby radio waves in a rough state or stopping the standby radio waves at the normal time, occurrence of wasted standby radio waves is suppressed.

Here, by keeping the standby radio waves in the dense state only in a predetermined time, even if a short-range state with an external communication device is not provided, it is possible to stop the dense state early and suppress power consumption.

Advantageous Effects of Invention

According to the present disclosure, in communication apparatuses that perform short-range wireless communication, in a case where the user has no intention to start communication by the communication device, it is possible to suppress a situation of communication connection and reduce power required for connection standby. Moreover, since a special operation load is not applied to the user especially, it is possible to maintain the user's convenience.

BRIEF DESCRIPTION OF DRAWINGS

FIG. 1 is a diagram explaining an appearance of a digital still camera according to an embodiment of the present disclosure;

FIG. 6 illustrates a relationship between polling interval and power consumption;

FIG. 12 is a flowchart illustrating a communication control process according to the third embodiment;

FIG. 13 is a flowchart illustrating a communication control process according to the fourth embodiment; and FIG. 14 is a block diagram illustrating exemplary major components of a communication apparatus of the present disclosure.

DESCRIPTION OF EMBODIMENTS

Figure 2:
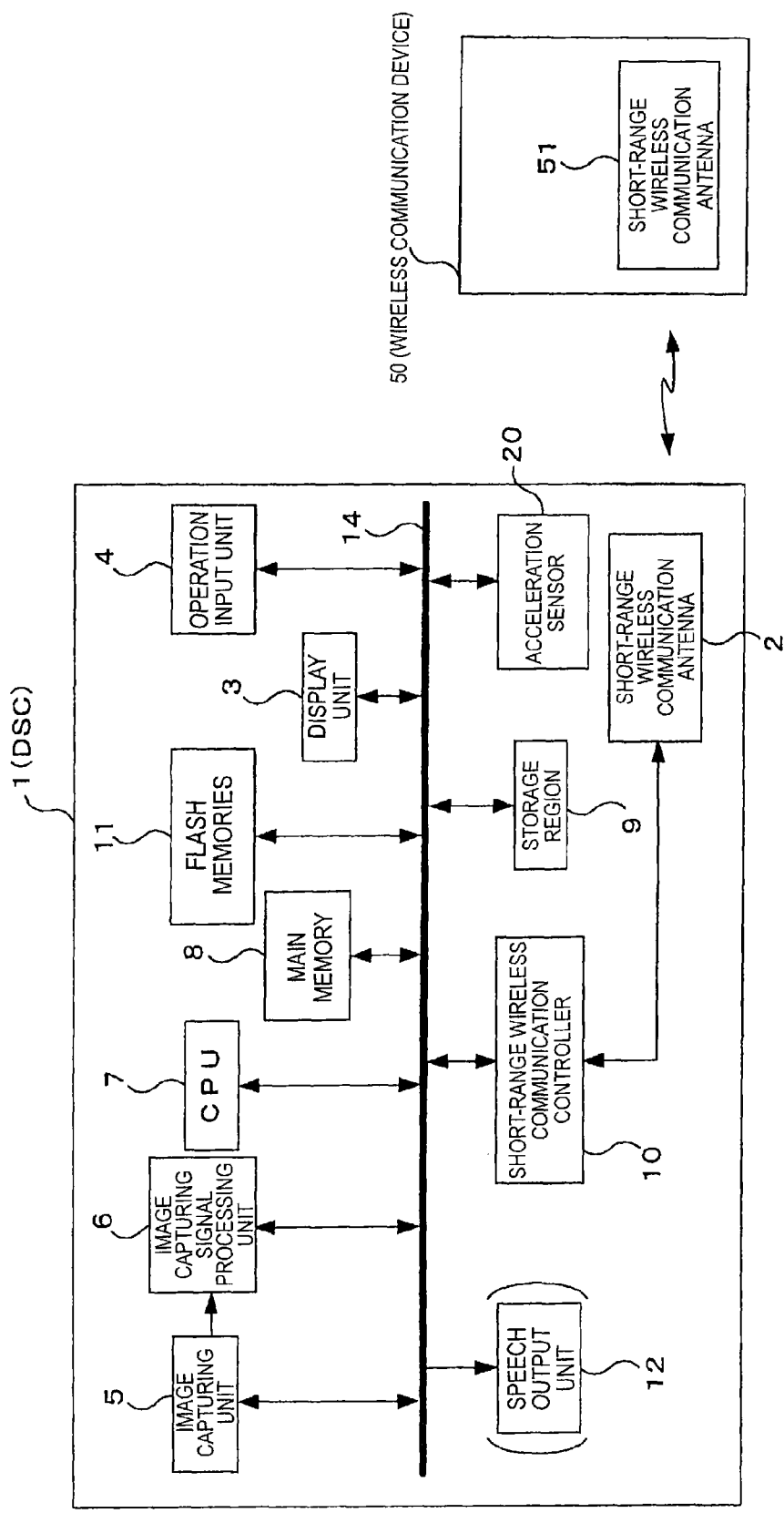
FIG. 2 is a block diagram illustrating an internal configuration of the digital still camera according to the embodiment.

Embodiments of the present disclosure will be described below. The description will be made in the following order. In an embodiment, a digital still camera (hereinafter referred to as "DSC") which performs a short-range wireless communication with an external communication device will be described as an example of a communication apparatus.

<1. Configuration of DSC (digital still camera)>
<2. Communication Control Process of First Embodiment>
<3. Communication Control Process of Second Embodiment>
<4. Communication Control Process of Third Embodiment>
<5. Communication Control Process of Fourth Embodiment>
<6. Modification Example>
<1. Configuration of DSC (Digital Still Camera)>

A configuration of DSC according to an embodiment of the present disclosure will be described. FIG. 1A is a front side perspective view illustrating an appearance of a DSC 1 according to an embodiment. FIG. 1B is a rear side (operation side) plan view illustrating an appearance of the DSC 1.

The DSC 1, as shown in FIG. 1A, includes a short-range wireless communication antenna 2 at a lower part of the front side. In this embodiment, although the DSC 1 includes the short-range wireless communication antenna 2, the DSC 1 may be configured to include a removable (detachable) communication module (a module including a short-range wireless communication controller 10 or a storage region for communication, which will be described later) which is equipped with the short-range wireless communication antenna 2.

The DSC 1, as shown in FIG. 1B, includes a display unit 3 on the rear surface. The display unit 3 may be configured to include a liquid crystal display (LCD), an organic electroluminescence (EL) display, or similar display device.

Operating portions constituting an operation input unit 4 are also provided to the DSC 1. The operating portions may include a playback menu start button 41, a decision button 42, a cross key 43, a cancel button 44, a zoom key 45, a slide key 46, a shutter button 47, and so on.

FIG. 2 is a block diagram illustrating an internal configuration of the DSC 1 and a state that the DSC 1 and other electronic device (wireless communication device 50) are connected to each other using a short-range wireless communication.

As shown in FIG. 2, the DSC 1 and the wireless communication device 5 can connect and communicate with each other using a short-range wireless communication. As an example of the short-range wireless communication, in addition to Bluetooth or TransferJet, other short-range wireless communication technologies may be used.

The DSC 1 includes an image capturing unit 5, an image capturing signal processing unit 6, a central processing unit (CPU) 7, a main memory 8, a storage region 9, a short-range wireless communication controller 10, a flash memory 11, and an acceleration sensor 20, in addition to the short-range wireless communication antenna 2, the display unit 3 and the operation input unit 4, shown in FIG. 1. These components can transmit and receive control signals or image capturing data between each other through a system bus 14.

The short-range wireless communication antenna 2, the storage region 9, and the short-range wireless communication controller 10 may be separately provided as a removable module without being embedded into the DSC 1.

The image capturing unit 5 includes image sensors, a lens system, a drive mechanism, and a diaphragm mechanism. The image sensors receive a light reflected from a subject and convert the received light into electrical signals. The lens system condenses a light reflected from the subject onto the image sensors. The drive and diaphragm mechanisms perform a focusing or zooming by moving a lens.

The components of the image capturing unit 5 are driven in response to a control signal from the CPU 7.

The image sensors may be a charge coupled device (CCD), a complementary metal oxide semiconductor (CMOS), and so on.

The image capturing signal processing unit 6 performs an analog-digital (A/D) conversion, the ISO gain setting, and other various signal processes on the electrical signal obtained by the image sensors of the image capturing unit 5, thereby generating the image capturing signal.

The image capturing signal processing unit 6 may create an image file including a still or moving image by performing a compression process or similar process on the image capturing signal. The image capturing signal processing unit 6 may transmit a through image to the display unit 3 on which the through image is displayed.

The display unit 3 displays an image before capturing a subject (a through image), contents such as a captured still or moving image file, a menu for operation (graphical user interface: GUI), and so on, in response to a control signal from the CPU 7.

The operation input unit 4 functions as an input means for inputting user operations and sends a signal according to the inputted operation to the CPU 7 and so on. The various operating portions as the operation input unit 4 are shown in FIG. 1, but it also may be possible to provide a touch panel in which the operation input unit 4 is integrated with the display unit 3.

The main memory 8 may be a volatile memory such as a random access memory (RAM). The main memory 8 also temporarily stores data or program as a working area when various data is processed by the CPU 7. For example, when an image data is processed in the image capturing signal processing unit at a timing the shutter button is pressed, the image data is read out by the main memory 8 and then written to the storage region 9.

The flash memory (non-volatile memory) 11 stores an operation system (OS) for controlling the components, applications necessary to communicate using the short-range wireless communication, or the like, except for contents files such as an image file.

The storage region 9 may be a non-volatile memory and functions as storage means for storing contents files such as an image file, attribute information and thumbnail image of the image file, and so on. The image file is stored in the form of a joint photographic experts group (JPEG), a tagged image file format (TIFF), a graphics interchange format (GIF), and so on.

The storage region 9 may be in the form of a memory card detachably connected to the DSC 1 or may be embedded into the DSC 1. For example, the storage region 9 may be implemented as a portable flash memory, a hard disk drive (HDD), or the like.

The short-range wireless communication antenna 2 receives radio signals emitted from other electronic devices and converts the radio signals into signals. The short-range wireless communication antenna 2 also performs a transmission of a standby radio signal or a transmission of a wireless radio wave signal to send data to other electronic devices.

The short-range wireless communication controller 10 controls the transmission or reception of signals using the short-range wireless communication antenna 2 based on a connection protocol of the short-range wireless communication in cooperation with the CPU 7.

The acceleration sensor 20 can detect the acceleration amount and acceleration direction of a chassis by the physical movement of the DSC 1 and convert them into a detection signal. For example, the CPU 7 can read the value of the detection signal, and it is assumed that it is possible to use the value of the detection signal for various intended purposes.

The CPU 7 generally controls the entire DSC 1 by executing the program stored in the flash memory 11 or similar memory device.

For example, the CPU 7 may control operations of the units including an image capturing operation, a playback operation of a captured image file, and a short-range wireless communication operation with an external device, and so on, according to user operations.

The system bus 14 can connect the units such as the CPU 7 to each other and allows the units to exchange signals between each other.

This FIG. 2A illustrates a speech output unit 11 in the DSC 1. This is installed in a case where voice announcement (such as electronic sound and message speech output) to the user is performed in the third and fourth embodiments described later. The speech output unit 11 outputs the message speech or the electronic sound on the basis of the control of the CPU 7.

The announcement to the user can be performed as message display in the display unit 3. In the third and fourth embodiments, in a case where only announcement by display is performed, the speech output unit 11 may not be installed.

The wireless communication device 50 which performs the short-range wireless communication with the DSC 1 includes units capable of processing information, such as a CPU, a ROM, a RAM, a display unit, an operation input unit, and so on, which are not shown, in addition to the short-range wireless communication antenna 51.

The signal which is received by the wireless communication device 5 is converted through the short-range wireless communication antenna 51. For the signals, an arithmetic process or the like is performed by the CPU. This allows the wireless communication device 50 to be connected to the DSC 1 using the short-range wireless communication and to establish the communication. In this case, the DSC 1 is in a standby state, which will be described later. In the state that the communication between them is established, the DSC 1 can transmit information such as contents files included in the DSC 1 to the wireless communication device 5.

<2. Communication Control Process of First Embodiment>

A communication control process of the first embodiment will be described with reference to a short-range wireless communication operation by the DSC 1.

Figure 3:
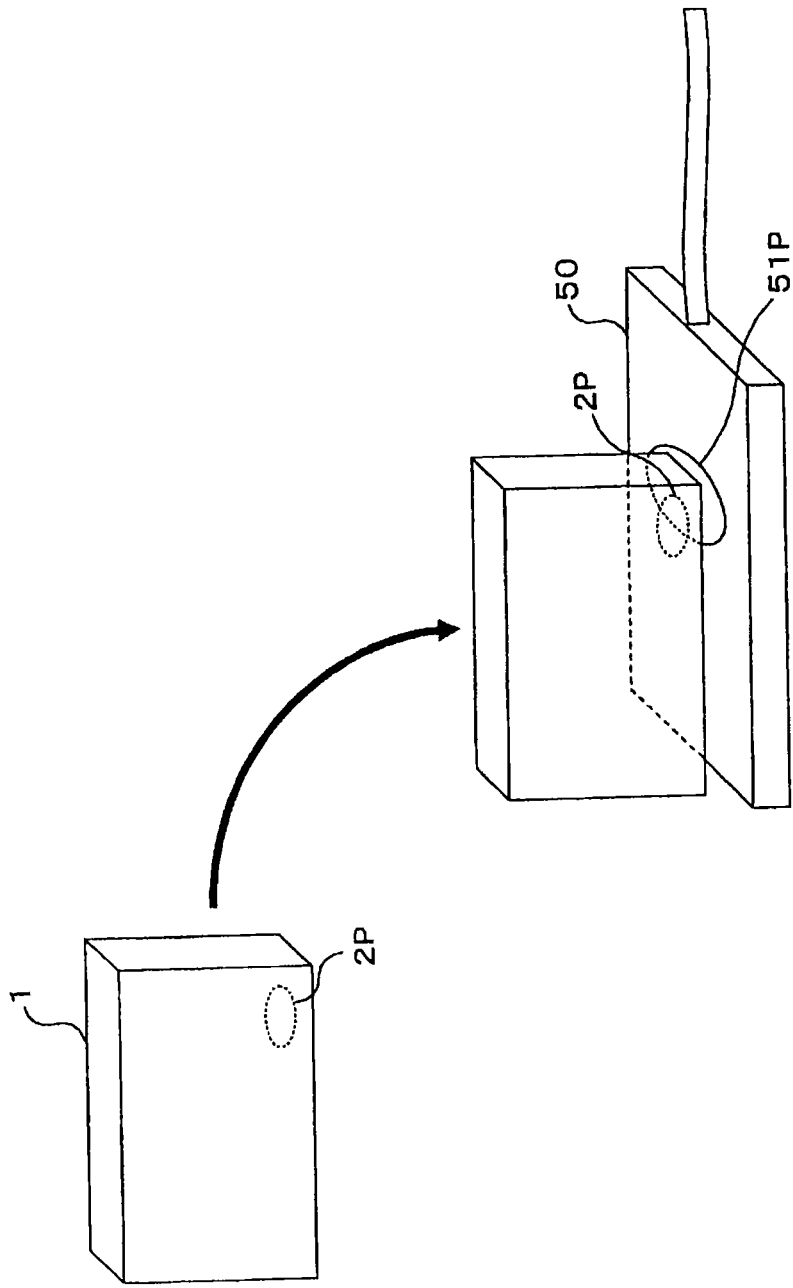
FIG. 3 is a diagram explaining a close proximity operation according to the embodiment.

FIG. 3 schematically illustrates the DSC 1 and the wireless communication device 50. The DSC 1 can be placed on the wireless communication device 50. In the state that the DSC 1 is placed on the wireless communication device 50, the short-range wireless communication is performed between the DSC 1 and the wireless communication device 50.

Moreover, in the DSC 1 in the figure, the arrangement position in the chassis of the short-range wireless communication antenna 2 is illustrated as antenna position 2P, and, in addition, the arrangement position of the short-range wireless communication antenna 51 in the wireless communication device 50 is illustrated as antenna position 51P.

Although devices have to be close to each other in short-range wireless communication, more specifically, antennas have to be close to each other.

Here, the wireless communication device 50 illustrated in FIG. 3 is connected to, for example, a personal computer, an image edit apparatus, an image storage unit and other information processing devices or image processing devices, and can forward content files or the like transmitted from the DSC 1 to these devices. Naturally, the wireless communication device 50 may be a tablet-type personal computer and the wireless communication device 50 itself may be the forwarding destination of the contents files or the like.

When a user tries to establish a communication connection between the DSC 1 and the wireless communication device 50 of a communication counterpart, as shown in FIG. 3, the communication initiates by placing the DSC 1 on the wireless communication device 5 and by causing the DSC 1 to be close to the wireless communication device 5.

Since the communication between the communication devices may not be maintained when they are not sufficiently close to each other in the short-range wireless communication, a method of initiating the communication in the state that the DSC 1 is placed on the wireless communication device 50 is commonly used. In this case, it may be impractical that the user continues to hold the DSC 1.

The operation in which a user holds the DSC 1 and places on the wireless communication device 50 to communicate between them is referred to as "proximity operation" hereinafter.

Figure 4:
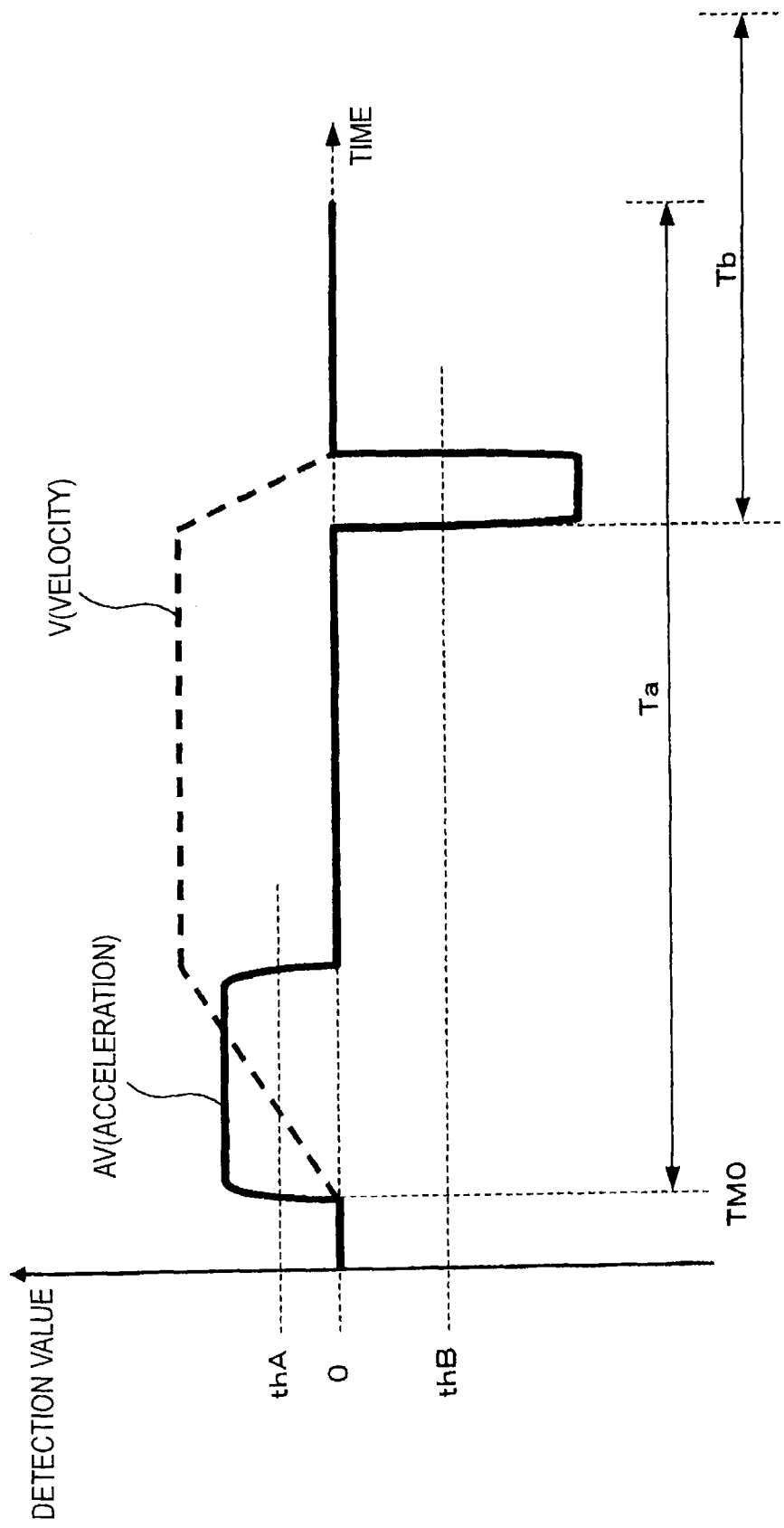
FIG. 4 is an explanatory diagram of waveforms showing the acceleration variation at the time of a short-range operation according to the embodiment.

In a case where the DSC 1 is moved like the chassis illustrated in FIG. 3 by a user's approach operation, a detection signal waveform from the acceleration sensor 20 in the DSC 1 shows a specific shape as illustrated in FIG. 4. In FIG. 4, it is assumed that the user starts the approach operation at the time of time axis TM0, and velocity change V and acceleration change AV in this case are illustrated.

At the start time of the approach operation, since the DSC 1 starts moving from a stopped state and therefore the velocity increases, a positive value is detected as acceleration.

After that, when the velocity is assumed to be constant while the chassis is moving toward the wireless communication device 50, although the acceleration shows a value of substantially 0, since the velocity rapidly becomes 0 when the DSC 1 is placed on the wireless communication device 5, a negative value of the acceleration is detected.

That is, in a case where the user performs the approach operation, since the acceleration sensor 20 of the DSC 1 detects the acceleration value as illustrated in FIG. 4, the CPU 7 of the DSC 1 can know that the case of the DSC 1 is subjected to the approach operation, from acceleration variation information that can be observed as a detection signal waveform of this value.

In the present embodiment, the DSC 1 causes the generation of standby radio waves to be in a rough state or stopped state at the normal time. The normal time denotes a period in which the DSC 1 is in a power-on state but it is not especially determined to perform short-range wireless communication. Subsequently, when determining that the approach operation with respect to the wireless communication device 50 is performed, the DSC 1 generates standby radio waves in the short-range wireless communication in the dense state for a certain period of time. In addition, after that, when a certain period of time passes without establishing communication, the standby radio waves are set to be in a non-dense or stopped state.

Here, to cause the standby radio waves to be a rough state means to lengthen a period interval (polling period) to send standby radio waves.

Although FIG. 6A illustrates an example of a polling period to generate standby radio waves, the dense state denotes a case where polling period P is short, and the rough state denotes a case where polling period P is long.

In the dense state, it is easy to detect a communicating party. On the other hand, although the rough state denotes a state where it is less likely to detect the communicating party, it does not mean that the detection is completely stopped.

The stopped state denotes a state where the generation of standby radio waves is completely stopped, and, in this case, the communicating party is not detected.

As an operation in the embodiment, it does not matter whether the standby radio waves at the normal time are set to be in the rough state or the standby radio waves at the normal time are set to the stopped state, and they should be set according to the features and characteristics of a device on which a function is mounted.

Moreover, the specific values of polling period P in the dense state and the rough state should also be set according to the features and characteristics of a device. The dense state and the rough state described below denote a state to shorten polling period P and a state to lengthen polling period P, respectively, as the DSC 1 of this example, and specific period values are not limited.

Figure 5:
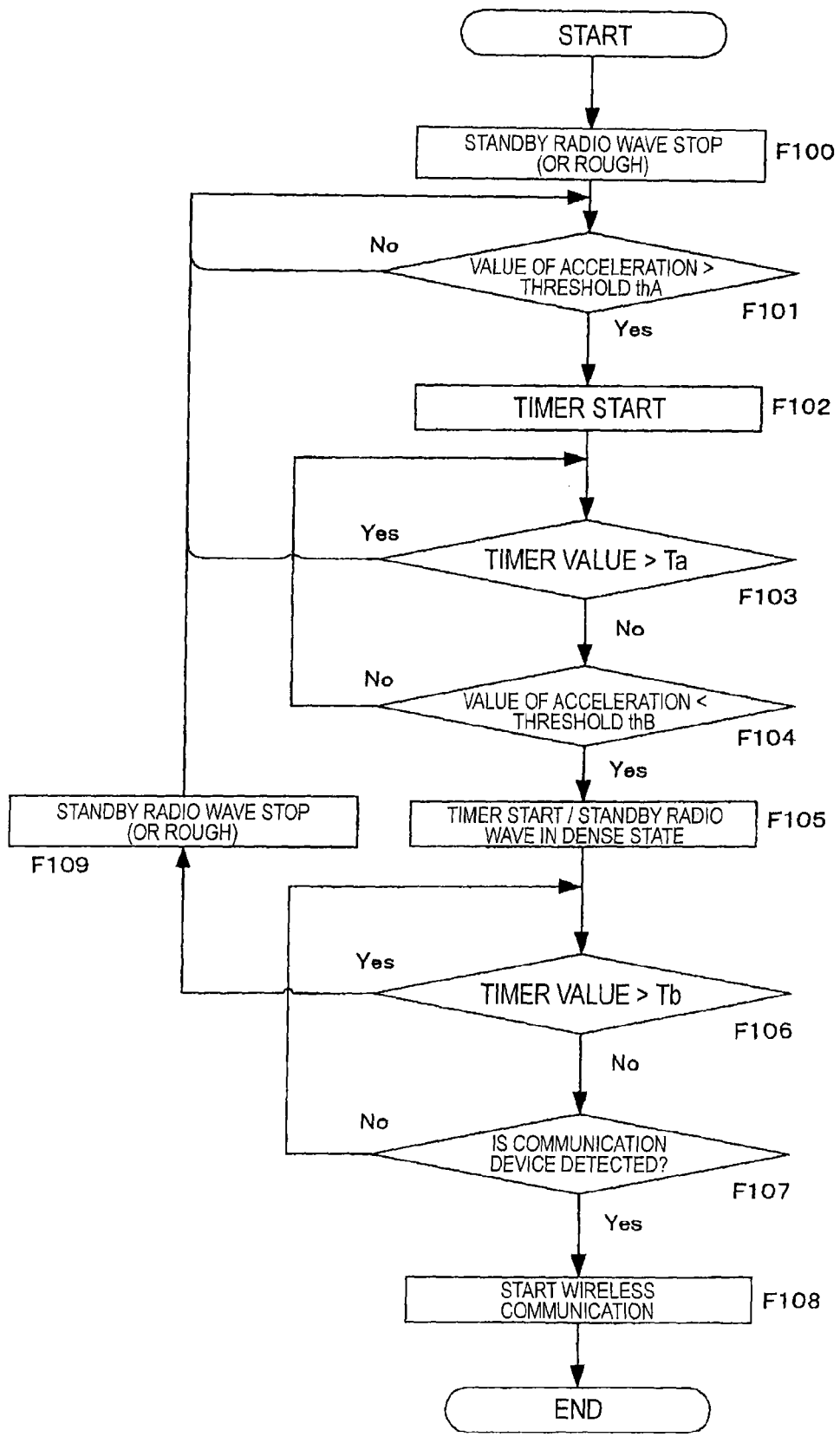
FIG. 5 is a flowchart illustrating a communication control process according to the first embodiment.

A specific processing example, in which the DSC 1 determines the acceleration variation caused by an approach operation and controls standby radio waves, is described in the flowchart illustrated in FIG. 5.

Here, although the flowchart illustrated in FIG. 5 is explained as control processing of the CPU 7 based on a program executed by the CPU 7, similar processing may be performed with hardware or may be performed with both hardware and software.

In a case where the DSC 1 is powered on, as step F100, the CPU 7 controls standby radio waves at the normal time. That is, the CPU 7 instructs the stopped state or rough state of standby radio wave generation to the short-range wireless communication controller 10. In response to this, the short-range wireless communication controller 10 sets the standby radio waves to a stopped state or a rough state.

As step F101, the CPU 7 acquires an acceleration detection signal (acceleration measurement value) from the acceleration sensor 20 and monitors whether the acceleration value is equal to or greater than constant threshold thA. Also, FIG. 4 illustrates one example of threshold thA and threshold thB described later.

An acquisition method of the detection value of the acceleration sensor 20 may be a method of acquiring the value of the acceleration sensor 20 from the CPU 7 at regular intervals or may be a method of notifying the value by interruption or the like from the acceleration sensor 20.

In a case where the acceleration measurement value does not exceed threshold thA, similar monitoring is continued.

In the monitoring processing in step F101, the CPU 7 proceeds to step F102 in a case where the acceleration measurement value exceeds threshold thA. In this case, the CPU 7 starts a time count using timer value Ta as a limit.

Here, there is a case where the timer is included in the CPU 7 as a function, there is a case where it is realized as a block different from the CPU 7, and any of these cases is possible.

After the time count starts, the CPU 7 continues the monitoring processing in steps F103 and F104 while ongoingly acquiring the acceleration measurement value of the acceleration sensor 20.

In step F103, whether the time count reaches timer value Ta is monitored. Moreover, in step F104, whether the value equal to or less than constant threshold thB is acquired as an acceleration measurement value is monitored.

In a case where the time count reaches timer value Ta, the CPU 7 returns from step F103 to the monitoring processing in F101.

Moreover, in a case where the CPU 7 detects in step F104 that the acceleration measurement value is equal to or less than threshold B, at this timing, the CPU 7 estimates that an approach operation is performed, and thereby determines that a communication opportunity is provided.

In these steps F101 to F104, in a case where the positive-direction acceleration based on the mobile velocity enhancement of the chassis and the negative-direction acceleration to the movement stop of the chassis are caused within a predetermined time (Ta), the DSC 1 determines that the chassis approaches the wireless communication device 50 and the communication opportunity is provided.

That is, when the positive acceleration measurement value based on the velocity enhancement at the start time of the approach operation is detected and further the negative acceleration measurement value is detected at the time the DSC 1 is placed on the wireless communication device 5 and the velocity rapidly becomes 0, the waveform shape illustrated in FIG. 4 is determined and estimated as the approach operation.

On the other hand, even if the positive acceleration is detected once, after that, in a case where the negative acceleration is not detected up to timer value Ta, the movement of the chassis of the DSC 1 is assumed to be not the approach operation, and it returns to step F101.

In a case where the approach operation is determined and it proceeds to step S 105, the CPU 7 newly starts the time count using timer value Tb as a limit.

In addition, the CPU 7 instructs the short-range wireless communication controller 10 to generate standby radio waves in a dense state. In response to this, the short-range wireless communication controller 10 performs an operation that shortens the polling period from the short-range wireless communication antenna 2 and generates standby radio waves.

In this state, the short-range wireless communication controller 10 tries communication connection with the wireless communication device 50 of the other party.

The CPU 7 monitors whether the time count reaches timer value Tb in step F106. Moreover, in step F107, whether the device of the communicating party is detected is monitored.

That is, timer value Tb defines the upper limit time of a detection period of the communication destination while the standby radio waves are generated in a dense state.

In a case where the CPU 7 detects the communicating party device in step F107, it proceeds to step F108, and the CPU 7 controls the short-range wireless communication controller 10 and starts wireless communication.

On the other hand, in a case where the time count reaches timer value Tb while the communicating party device is not detected, the CPU 7 proceeds from step F106 to F109 and instructs the stopped state or rough state of standby radio wave generation to the short-range wireless communication controller 10. In response to this, the short-range wireless communication controller 10 sets the standby radio waves to the stopped state or the rough state. Subsequently, the CPU 7 returns to the monitoring processing in step F101.

The above-mentioned processing in FIG. 5 has the following features.

The CPU 7 controls standby radio waves in the rough state or the stopped state at the normal time.

The CPU 7 estimates whether an approach operation that makes the chassis of the DSC 1 approach the wireless communication device 50 is performed, from acceleration variation recognized by the acceleration detection signal (acceleration measurement value) from the acceleration sensor 20, and, in a case where the approach operation is determined, a communication opportunity is determined.

In a case where the communication opportunity is determined, the CPU 7 controls the standby radio waves in the dense state.

To make the standby radio waves in the dense state is performed only by a predetermine time (time value Tb), and, if communication cannot be established during the time, the standby radio waves are returned to a normal state such as the rough state and the stopped state.

In such the first embodiment, the following effects are achieved.

Although polling period P has been previously described in FIG. 6A, it is easy to detect the communicating party in the dense state but it is not easy to detect the communicating party in the rough state. In the stopped state, the communicating party is not detected. Meanwhile, although the relationship between the power consumption and the polling period is illustrated in FIG. 6B, the power consumption related to standby increases as it becomes the dense state in which polling period P is short. There is little power consumption in the rough state and three is no power consumption related to standby radio waves in the stopped state.

In view of the above, when the processing in the first embodiment is considered, the approach operation is detected to determine the communication opportunity and set the standby radio waves to the dense state while they are set to the rough state or the stopped state in other cases, such that it is possible to increase a possibility of communication connection only in a case where there is a high possibility that the user intends short-range wireless communication. In other words, in a case where there is a low possibility that the user intends the short-range wireless communication, it is possible to decrease the possibility of communication connection, which is suitable in the point of preventing the situation in which unintended communication is performed as much as possible.

In addition, the dense state with large power consumption is set only in a case where there is a high possibility that the user intends the short-range wireless communication, and the rough state with less power consumption or the stopped state without power consumption related to standby radio waves is set in other cases, which is effective for reduction of the power consumption related to the standby.

Moreover, it is also effective to set the standby radio waves to the dense state only by a predetermined time (timer value Tb). Although the user's approach operation is determined from the acceleration measurement value, the approach operation is not necessarily limited to an "operation to place the DSC 1 on the wireless communication device 50."

For example, an operation to place the DSC 1 on the desk or the like by the user is performed multiple times in the normal user use.

Here, when a general use status is considered, in a case where the user finishes using the DSC 1 and places it on the desk or the like, since it is powered off in many cases, the above-mentioned processing in FIG. 5 is not performed in these cases. However, depending on circumstances, there is a case where the user places the DSC 1 on the desk or the like while the DSC 1 is powered on. In this case, in the determination by the acceleration measurement value, substantially the same waveform as in FIG. 5 may be observed and a communication opportunity may be determined. Then, standby radio waves are generated in the dense state while the communicating party is not detected.

In this example, since standby radio waves in the dense state in which the communicating party cannot be detected is generated using the time of timer value Tb as a limit, in a case where it is not possible to detect the communicating party in a state in which it is simply placed on the desk, they do not indefinitely remain in the dense state but return to the rough state or the stopped state after the lapse of certain time.

That is, in this example, the standby radio waves are set to the dense state when it is determined that there is a high possibility that the user intends the short-range wireless communication, even if the user does not actually intend the communication, they do not indefinitely remain in the dense state wastefully but are returned to the rough state or the stopped state. By this means, even if complete determination of user's communication intention cannot be performed from acceleration detection, it is possible to suppress the power consumption to the minimum necessary.

Moreover, in this example, for the user, when the approach operation to place the DSC 1 on the wireless communication device 50 is performed, wireless communication is performed, and, for example, since it is possible to transmit content files or the like to the side of the wireless communication device 50, it is possible to maintain the convenience without adding an extra operation burden to the user.

By the way, regarding other cases than the approach operation time, whether the standby radio waves are set to the rough state or the standby radio waves are set to the stopped state may be decided according to a device, but the following effects are acquired.

In a case where the rough state is set, it is more disadvantageous than a case where the stopped state is set for power consumption reduction. However, there is an advantage that a probability of communication connection is left even at the normal time at which the approach operation is not determined. According to circumstances, even in a case where the waveform of an observed acceleration detection signal is different from FIG. 4 described above, there is a case where the user intends communication.

That is, when the user performs an operation to make the DSC 1 approach the wireless communication device 50 or the like, the CPU 7 cannot detect it. In a case where the DSC 1 and the corresponding wireless communication device 50 are devices with such a use aspect, the rough state is normally set and it is suitable that at least a possibility of being able to establish communication connection is left.

On the other hand, when the stopped state is set at the normal time, it is advantageous for reduction of power consumption. In addition, when the stopped state is set, there is a high prevention effect of user's unintended communication. However, by contrast, in a case where communication is demanded to be performed, a specific approach operation is requested to the user.

Therefore, in a case where the DSC 1 and the corresponding wireless communication device 50 perform communication only by the specific approach operation, it is suitable to set the stopped state at the normal time.

<3. Communication Control Processing According to Second Embodiment>

Communication control processing according to the second embodiment by the DSC 1 is described.

In the second embodiment, the acceleration sensor 20 detects the acceleration value of the waveform illustrated in FIG. 4 and detects the three-dimensional generation direction of acceleration.

To be more specific, the acceleration sensor 20 does not detect the acceleration value as the scalar quantity value but detects the acceleration value as the vector quantity value, and can detect the acceleration amount in the three-dimensional direction.

Figure 7:
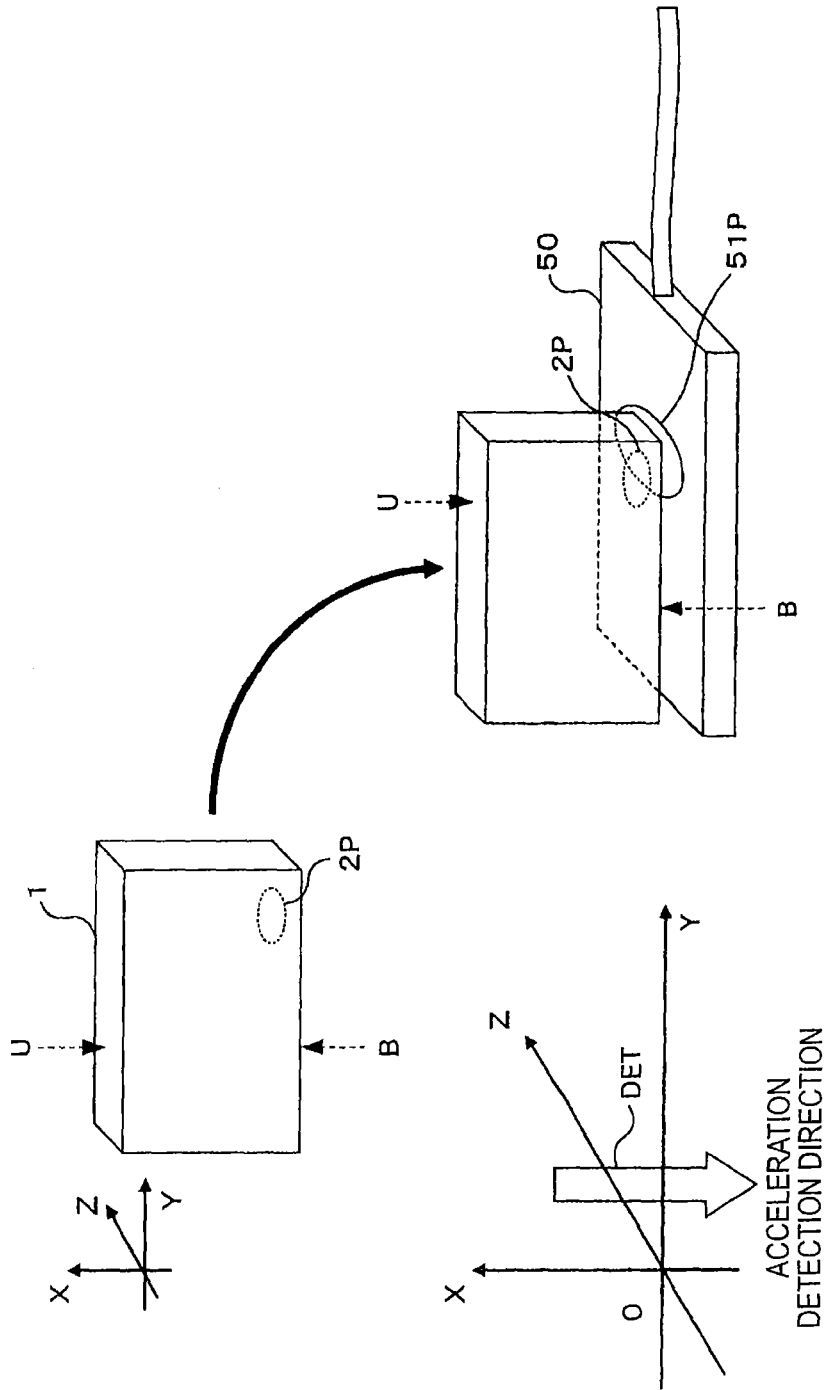
FIG. 7 is an explanatory diagram of the acceleration direction detected according to the embodiment.

For example, in a case where the user performs the approach operation illustrated in FIG. 3 described above, regarding the acceleration detection direction at the time of adjacency, when the X axis, the Y axis and the Z axis are defined using the upper part of the DSC 1 as the positive direction of the X axis as illustrated in FIG. 7, the acceleration (acceleration detection direction DET) in the negative direction of the X axis is detected.

Here, in FIG. 7 (and FIG. 8, FIG. 9 and FIG. 11 described below), arrow U shows the top surface side of the DSC 1 and arrow B shows the bottom surface side of the DSC 1.

The position of the short-range wireless communication antenna 2 is assumed to be arranged in the bottom surface side in the DSC chassis as illustrated by position 2P.

In this example, when execution of some approach operation is detected from the acceleration value, the acceleration direction is simultaneously detected at that time to determine in which direction the approach operation is performed. By this means, whether the user has an intention to start communication can be detected more accurately than the method in the first embodiment.

A specific example is described.

According to the example of FIG. 7, the direction in which the DSC 1 approaches the wireless communication device 50 of the communicating party is the negative direction of the X axis direction of the DSC 1. Since the short-range wireless communication antenna 2 of the DSC 1 exists on the bottom surface of the DSC 1, it becomes adjacent to the wireless communication antenna 51 (position 51P) of the wireless communication device 5, and it is considered that the user has an intention to start communication.

Figure 8:
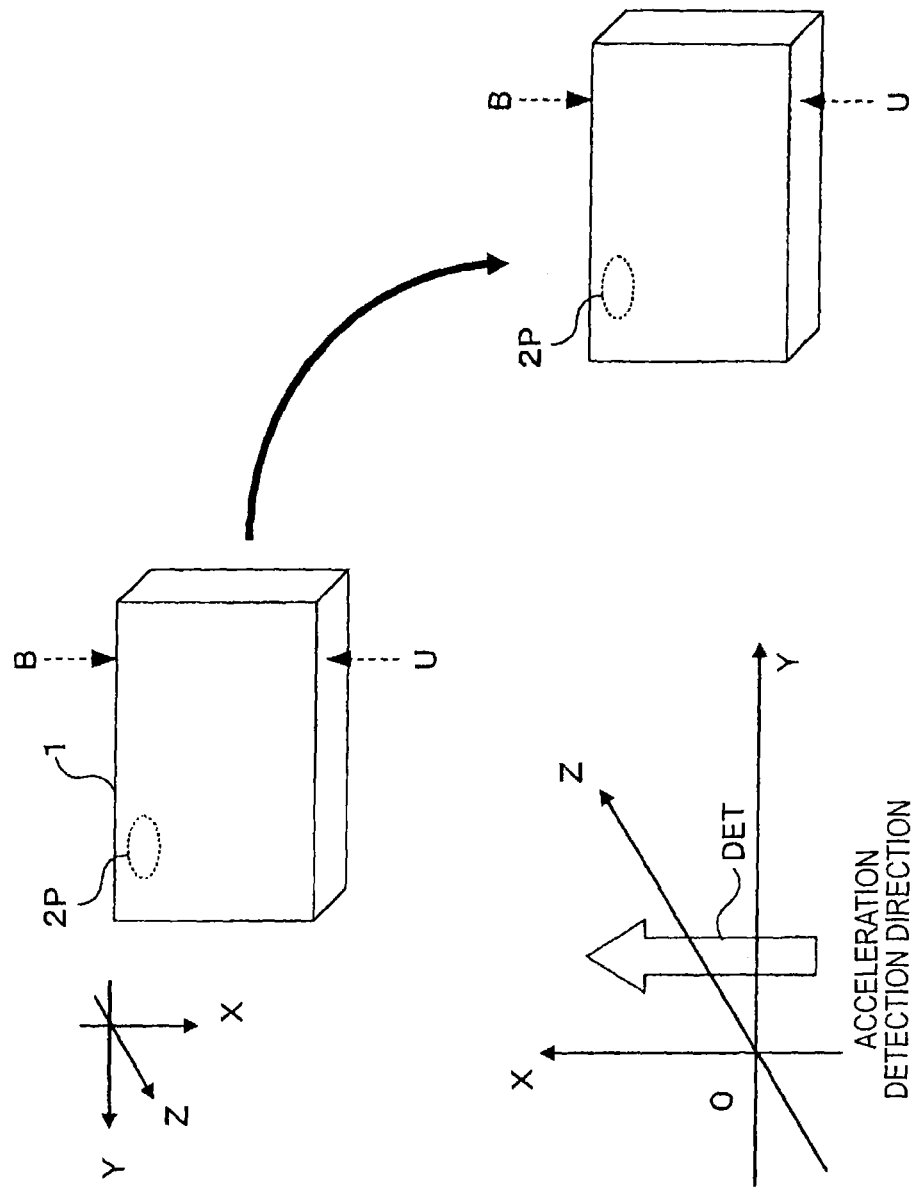
FIG. 8 is an explanatory diagram of the acceleration direction detected according to the embodiment.

Meanwhile, as illustrated in the example of FIG. 8, the acceleration in the vertically opposite direction to FIG. 7, that is, the acceleration may be detected in which acceleration detection direction DET is the positive direction in the X axis direction.

In the example of this FIG. 8, the waveform of acceleration as the scalar quantity is similar to the waveform as the approach operation. However, if the wireless communication device 50 exists, the direction in which the wireless communication device 50 approaches is the top surface side opposite to the installation direction (position 2P that is the bottom surface side) of the short-range wireless communication antenna 2 of the DSC 1.

Normally, it is less likely to think that the user obviously makes the DSC 1 vertically opposite and performs the approach operation for the communicating party, and it is considered that there is a low possibility that the user has an intention to start communication.

Figure 9:
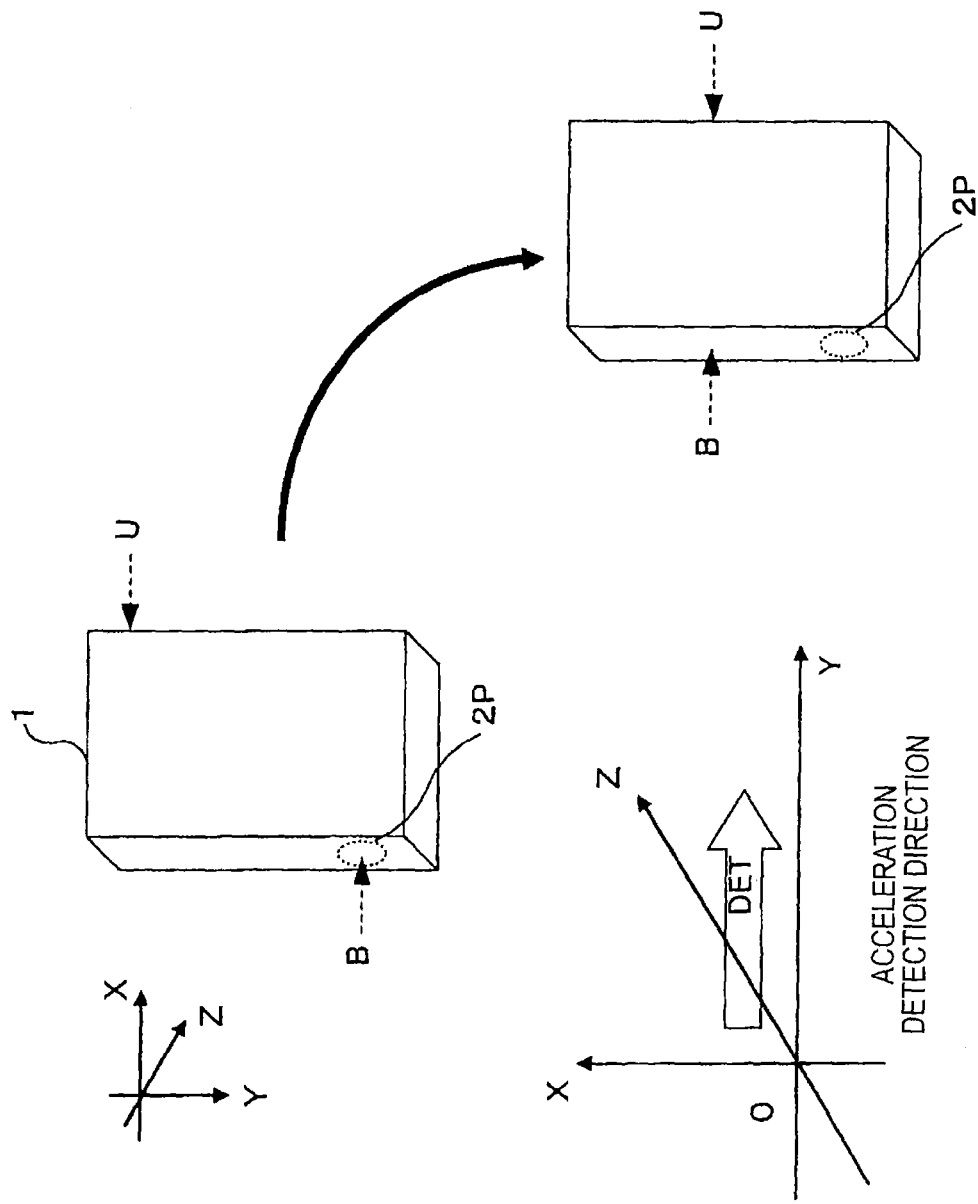
FIG. 9 is an explanatory diagram of the acceleration direction detected according to the embodiment.

In addition, as illustrated in the example of FIG. 9, a case is possible where when the acceleration is detected in the direction in which the DSC 1 is longitudinally put. It is a case where acceleration detection direction DET is the positive direction in the Y axis direction.

In the example of this FIG. 9, the waveform of acceleration as the scalar quantity is similar to the waveform as the approach operation, but the direction does not correspond to the installation direction (position 2P) of the short-range wireless communication antenna 2 of the DSC 1. Normally, it is not considered that the user longitudinally puts the DSC 1 and performs the approach operation, and it is considered that there is a low possibility that the user has an intention to start communication.

As illustrated in the examples of FIGS. 7 to 9, the acceleration direction at the time of performing the approach operation with a communication start is decided by the position of the antenna in the short-range wireless communication device, and, in a case where the direction matches the direction of the acceleration at the time the approach operation is detected, it is possible to determine that the user has an intention to start communication.

Therefore, taking into account such acceleration direction information, in a case where it is determined that the user has an intention to start communication, standby radio waves are sent in the dense state for a certain period of time. Otherwise, the standby radio waves are set to the rough state or the stopped state. By this means, it is possible to prevent user's unintended communication and reduce the power consumed for the standby radio waves.

Figure 10:
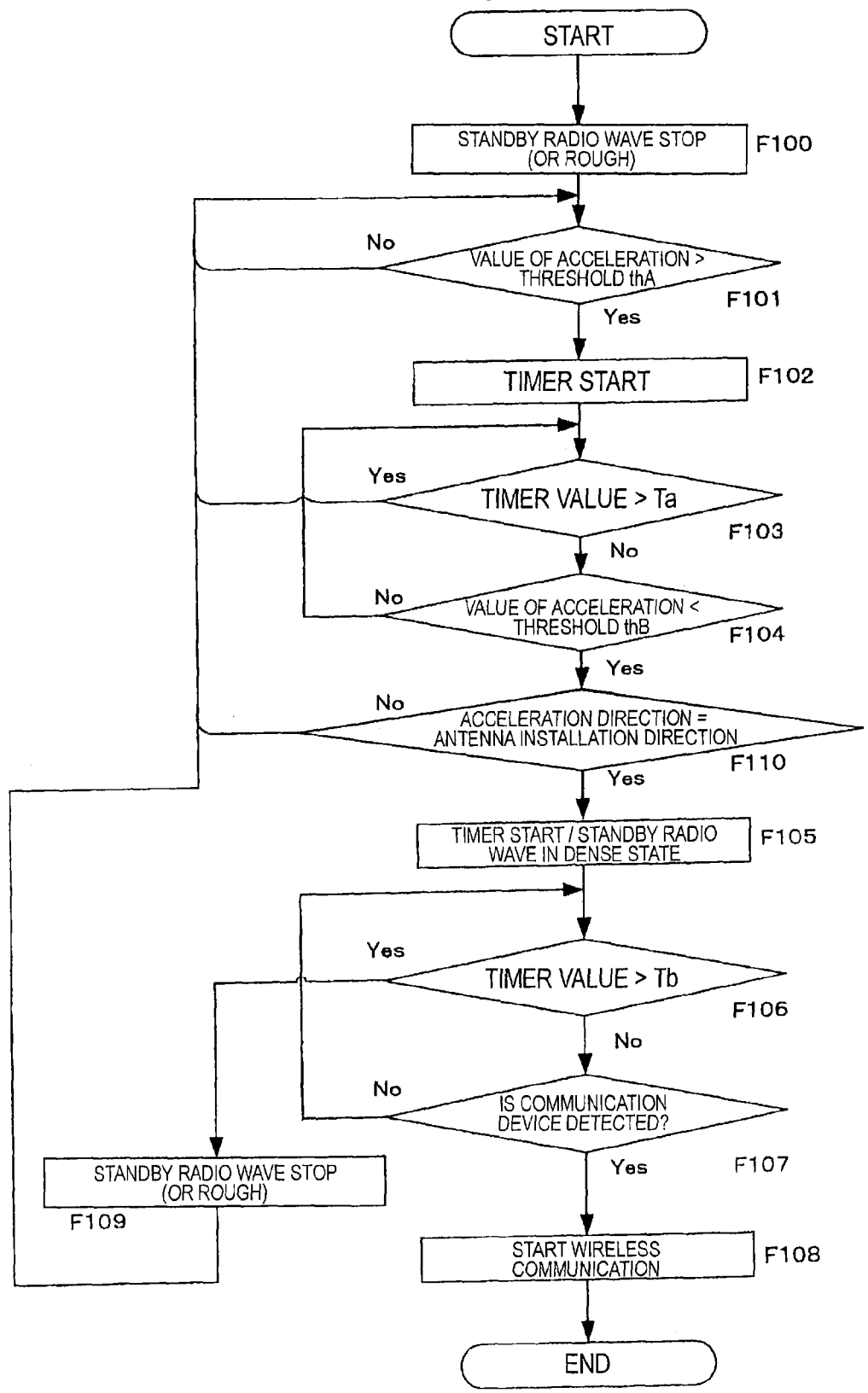
FIG. 10 is a flowchart illustrating a communication control process according to the second embodiment.

FIG. 10 illustrates communication control processing of the CPU 7 according to the second embodiment.

Here, in FIG. 10, since steps F100 to F104 and F105 to F109 are similar to FIG. 5, overlapping explanation is omitted. This FIG. 10 shows a processing example in which step F110 is added to the steps of FIG. 5.

In the processing in this FIG. 10, first, the CPU 7 determines the approach operation by the waveform of acceleration as the scalar quantity in steps F100 to F104. Subsequently, in a case where it is determined that it corresponds to the approach operation with respect to the scalar quantity, in step F110, the CPU 7 determines whether the acceleration direction matches the antenna installation direction.

In the case of the examples described in FIGS. 7 to 9, when acceleration detection direction DET is the negative direction of the X axis, it is determined that they are matched.

On the other hand, in a case where acceleration detection direction DET is the positive direction of the X axis, it is determined that the acceleration direction does not match the antenna installation direction.

Figure 11:
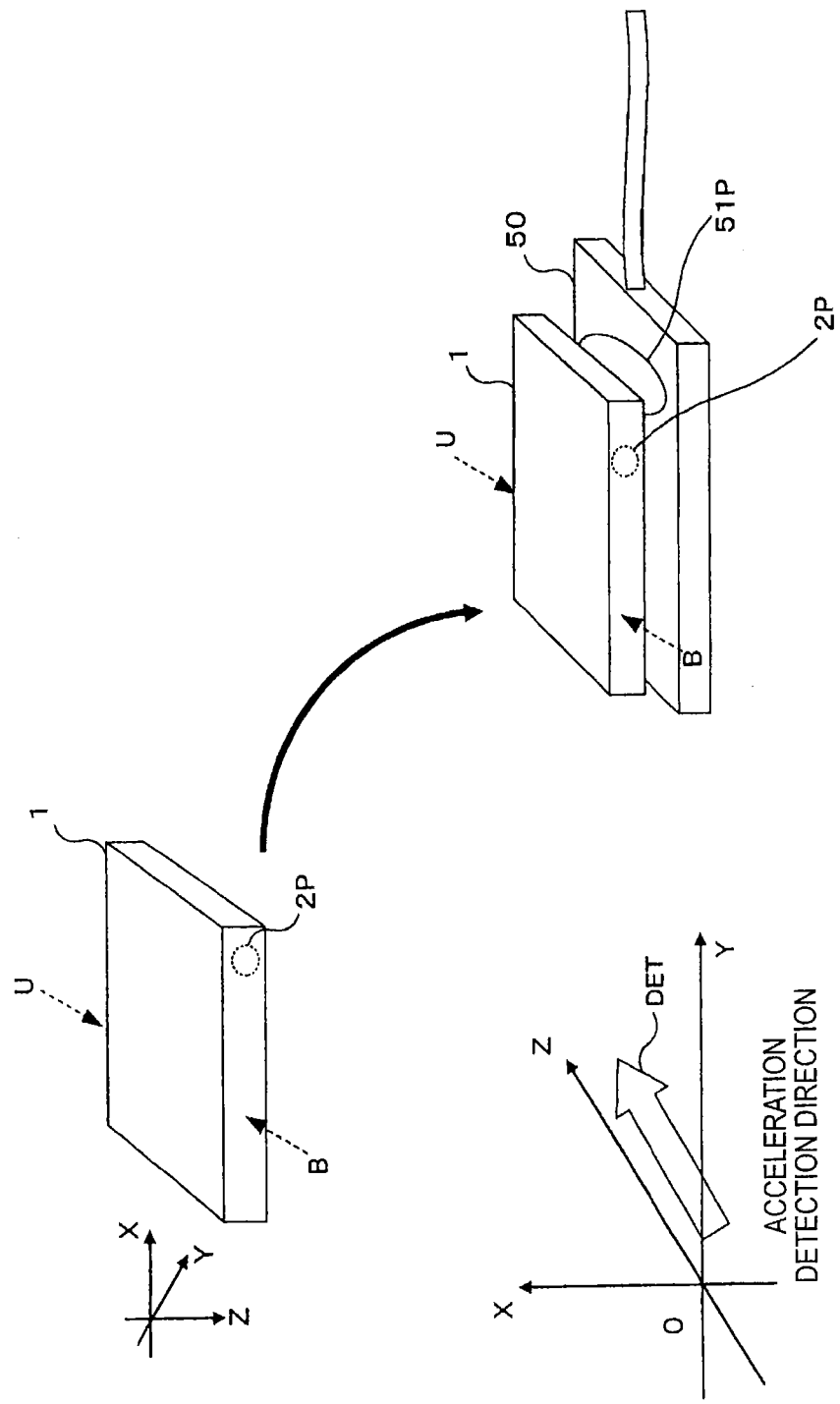
FIG. 11 is an explanatory diagram of the acceleration direction detected according to the embodiment.

Also, as described later in FIG. 11, there is a case where acceleration detection direction DET is the positive or negative direction of the Z axis. It is a case where the front surface or back surface of the DSC 1 is put on the upper surface of the wireless communication device 50. In this case, communication is possible in many cases, or a case is assumed where it is put as above taking into account that the user can perform communication. Therefore, in a case where the short-range wireless communication antenna 2 of the DSC 1 is assumed to be arranged and have performance such that communication is possible in the state as illustrated in FIG. 11, when acceleration detection direction DET is the positive or a negative direction of the Z axis, it may be determined that the acceleration direction matches the antenna installation direction. Alternatively, in that case, it may be determined that they are not matched. In the case of the positive or negative direction of the Z axis, the determination in step F110 may be decided according to the performance and use status or the like of the device.

In a case where it is determined in step F110 that the acceleration direction does not match the antenna installation direction, the CPU 7 returns to step F101. That is, a possibility of user's communication intention is assumed to be low and standby radio waves are not set to the dense state.

On the other hand, in a case where it is determined in step F110 that the acceleration direction matches the antenna installation direction, the CPU 7 proceeds to step F105. That is, it is regarded that there is a high possibility of user's communication intention and a communication opportunity is provided, the standby radio waves are set to the dense state. The processing in steps F105 to F109 is similar to the first embodiment.

As described above, according to the second embodiment, the CPU 7 recognizes acceleration variation information and three-dimensional acceleration direction information about generated acceleration, from an acceleration detection signal acquired by the acceleration sensor 20. Subsequently, from the acceleration variation information and the acceleration direction information, in a case where it is estimated that the chassis approaches the wireless communication device 50 in a specific acceleration direction state, a communication opportunity is determined, and the standby radio waves are set to the dense state for a certain period of time (period to timer value Tb).

According to this second embodiment, similar to the first embodiment, it is possible to save the power and acquire an unnecessary communication prevention effect while maintaining the user's convenience. Especially, by enhancing the determination accuracy of user's communication intention, it is possible to further improve these effects.

<4. Communication Control Processing According to Third Embodiment>

Communication control processing according to the third embodiment by the DSC 1 is described.

In the third embodiment, similar to the second embodiment described above, execution of the short-range operation and estimation of user's intention to start communication are performed from the acceleration variation information and the acceleration direction information. In addition to this, in the third embodiment, in a case where it is considered that the user has an intention to start communication, since the way of putting the chassis of the DSC 1 is not adequate, it is detected that the antenna direction is not correct, and display or voice announcement is performed such that the way of putting it is corrected to make the antenna direction adhere to a short-range wireless communication antenna of the communicating party.

Referring to the above example of FIG. 7, since the direction to approach the communicating party is the negative direction of the X axis direction of the DSC 1 and the short-range wireless communication antenna 2 of the DSC 1 exists on the bottom surface of the DSC 1, it approaches the antenna 51 of the wireless communication device 50 and it is considered that the user has an intention to start communication.

Meanwhile, like the example of FIG. 11, there is a case where the DSC 1 is put in a horizontal manner. In this example, although the waveform of acceleration as the scalar quantity is a waveform as the approach operation, while the direction is the positive direction of the Z axis and the user has an intention to start communication, it cannot say that the direction of the short-range wireless communication antenna 2 is not appropriate for the start of communication.

In the state illustrated in this FIG. 11, depending on the communication performance of the device, since it does not approaches the short-range wireless communication antenna 51 of the communicating party, even if the user has an intention to perform communication, the radio wave status is not good and therefore there is a possibility of disconnection.

In the third embodiment, in such a case, display or voice announcement is performed such that the way of putting it is corrected to make the antenna direction adhere to the short-range wireless communication antenna 51 of the communicating party. By this means, the user is encouraged to correct the posture of the DSC 1 and increase a possibility of putting radio waves into a good state.

FIG. 12 illustrates communication control processing of the CPU 7 according to the third embodiment.

Here, in FIG. 12, steps F100 to F104 and F105 to F109 are similar processing to FIG. 5 and step F110 is similar processing to FIG. 10.

This FIG. 12 is a processing example in which steps F111 and F112 are added to the steps of FIG. 10.

In this FIG. 12, first, in steps F100 to F104, the CPU 7 determines an approach operation by the waveform of acceleration as the scalar quantity in the same way as the first and second embodiments. Subsequently, in a case where it is determined that the scalar quantity corresponds to the approach operation, similar to the second embodiment, the CPU 7 determines in step F110 whether the acceleration direction matches the antenna installation direction.

However, in step F110 in this case, as illustrated in the example of FIG. 7, it is determined that they are matched only in a case where acceleration detection direction DET is the negative direction of the X axis, and, otherwise, it is determined that they are not matched.

That is, it is determined that the antenna directions are not matched in a case where acceleration detection direction DET is the positive direction of the X axis, the positive or negative direction of the Y axis or the positive or negative direction of the Z axis.

In a case where it is determined that the antenna directions are not matched, the CPU 7 proceeds to step F111 and determines whether the acceleration direction is vertical to the antenna installation direction. To be vertical to the antenna installation direction denotes, for example, a case like FIG. 11, that is, a case where acceleration detection direction DET is the positive or negative direction of the Z axis.

In step F111, in a case where it is determined that the acceleration direction is not vertical to the antenna installation direction, that is, in a case where acceleration detection direction DET is the positive direction of the X axis or the positive or negative direction of the Y axis, the CPU 7 returns to step F101. That is, it is determined that there is a low possibility of user's communication intention, the standby radio waves are not set to the dense state.

On the other hand, in a case where it is determined in step F111 that the acceleration direction is vertical to the antenna installation direction, the CPU 7 proceeds to step F112. Subsequently, the CPU 7 performs caution announcement for the user.

For example, in the display unit 3, an alert message like "in the case of performing wireless communication, please make the bottom surface approach the facing device" is displayed, or similar alert message speech is output from the speech output unit 12. Alternatively, electronic sound is generated from the speech output unit 12. Alert message display in the display unit 3 may be performed together with an output of the alert message speech and the electronic sound.

When such an alert announcement is performed, the CPU 7 proceeds to step F105. Here, in a case where it is determined in step F110 that the acceleration direction matches the antenna installation direction, the CPU 7 also proceeds to step F105 and subsequent steps.

That is, in these cases, it is determined that there is a high possibility of user's communication intention, the standby radio waves are set to the dense state. The processing in steps F105 to F109 is similar to the first and second embodiments.

As described above, according to the third embodiment, in a case where the CPU 7 estimates from acceleration variation information and acceleration direction information that the chassis of the DSC 1 approaches an external communication device such as the wireless communication devices 50 in a specific acceleration direction state, an announcement output is performed according to the positional relationship between the antenna direction of the DSC 1 and the wireless communication device 50 or the like.

Especially, in a state where the positional relationship between the antenna direction of the DSC 1 and the wireless communication device 50 is communicable but is not optimal, when it is estimated that the chassis of the DSC 1 and the wireless communication device 50 are close to each other, a communication opportunity is determined and an alert output from the display unit 3 or the speech output unit 11 is performed.

By this means, the user can know that the putting way is not adequate for communication, and in a case where there is a communication intention, it is expected to correct the way of putting the DSC 1. In that case, it is assumed that it is possible to perform communication in a good wireless state.

<5. Communication Control Processing According to Fourth Embodiment>

The fourth embodiment is described. Although the fourth embodiment is substantially the same as the above-mentioned third embodiment, processing corresponding to a case where the user corrects the way of putting the DSC 1 is added.

Although FIG. 13 illustrates communication control processing of the CPU 7, since it is similar to FIG. 12 except for that steps F113 and F114 are added, explanation about only steps F113 and F114 is given.

As explained in third embodiment, there is a case where an alert message is notified in step F112 according to how to put the DSC 1.

In this case, although standby radio waves are set to the dense state for a certain period of time using timer value Tb as a limit from the timing of step F105, if the way of putting the DSC 1 is not adequate like FIG. 11, there is a high possibility that connection cannot be established.

Therefore, although the user is notified, the corresponding timing for the user is not decided. When the user corrects the posture of the DSC 1, at that timing, the time count may reach timer value Tb. For example, in a case where step F109 is processing for the stopped state instead of the rough state, a case is possible where communication is not possible though the user corrects the posture of the DSC 1.

Therefore, in this example, the CPU 7 sets standby radio waves to the dense state in step F105, and, after starting the time count, monitors correction of the posture of the DSC 1 from acceleration variation information and acceleration direction information in step F113.

Here, when a state continues where the communicating party cannot be detected, there is a case where the user corrects the posture of the DSC 1 according to the announcement in step F112. When it is detected that the posture of the DSC is corrected and the state of FIG. 11 is corrected to the state of FIG. 7, the CPU 7 proceeds to step F114 and restarts the time count to timer value Tb from the beginning.

By this processing, when the posture of the DSC 1 is corrected, the dense state of standby radio waves continues for a certain period of time from that timing, and it is possible to enhance the accuracy of communication establishment.

<6. Transformation Example>

Although embodiments have been described above, the communication apparatus configuration and communication control processing of the present disclosure are not limited to the embodiments and various transformation examples are possible.

As for the determination of approach operation by acceleration variation with an acceleration detection value, in each embodiment, the positive-direction acceleration is detected with respect to the acceleration detection waveform of FIG. 4, and, after that, the negative-direction acceleration is detected in predetermined time Ta (steps F101 to F104 of each communication control processing).

The determination method of the approach operation is not limited to this and following (a), (b) and (c) are possible.

(a) The approach operation is determined in a case where the negative-direction acceleration is detected after the lapse of a zero-acceleration period from detection of the positive-direction acceleration in predetermined time Ta.

(b) The positive-direction acceleration is detected in predetermined time Ta, and, after that, the negative-direction acceleration is detected. In addition, after that, when the zero-acceleration period is maintained for a certain period of time (that is, a state after placement on the wireless communication device 50 is maintained), the approach operation is determined.

(c) After the positive-direction acceleration is detected in predetermined time Ta, the negative-direction acceleration is detected after the lapse of the zero-acceleration period. In addition after that, when the zero-acceleration period is maintained for a certain period of time (that is, a state after placement on the wireless communication device 50 is maintained), the approach operation is determined.

Although this is an example, thus, various methods for determining the approach operation are possible. Naturally, it is possible to set a window period or the like that limits the time condition and detection period of each period, and perform the approach determination more accurately.

Moreover, as an acceleration detection value actually output from the acceleration sensor 20, it is naturally assumed that noise components for the approach operation determination can be adequately filtered.

Moreover, in the embodiments, although the approach operation denotes an approach operation of "putting" the DSC 1 on the wireless communication device 50 and this is determined from the waveform of the acceleration measurement value as illustrated in FIG. 4, the operation mode of the user's approach operation varies according to the actual use status and the device type, and so on.

For example, there is a case where the other party's device corresponding to the wireless communication device 50 is on the wall surface and a communication apparatus corresponding to the DSC 1 or the like is caused to approach this device.

Therefore, regarding the approach operation determination, the approach determination should be performed by corresponding waveform detection taking into account the type, format and use status of an actual communication apparatus.

In the embodiments, although the DSC 1 is provided as an example of a communication apparatus, it is not naturally limited to the DSC 1, and it is possible to realize the communication apparatus of the present disclosure in various devices.

For example, a portable telephone, a video camera device, a mobile terminal device a portable game device, an information processing apparatus, a portable music player, a portable television receiver and other various devices are possible. From the viewpoint that the acceleration by motion of the device itself is detected and determined, a small device that can be carried by the user's hand is suitable, it is not necessarily limited to this.

In a case where these various devices are realized as the communication apparatus 100 of the present disclosure, those devices only have to include the configuration of FIG. 14.

FIG. 14 illustrates a control unit 101, an acceleration sensor 102, a short-range wireless communication controller 103 and a short-range wireless communication antenna 104.

As a short-range wireless communication unit that performs short-range wireless communication with an external communication device, the short-range wireless communication controller 103 and the short-range wireless communication antenna 104 are provided.

Moreover, there is provided the acceleration sensor 102 that detects the acceleration by the movement of the chassis.

The control unit 101 performs approach determination, acceleration direction determination or standby operation control on the short-range wireless communication controller 103. That is, the control unit 101 estimates whether the chassis of the communication apparatus 100 approaches an external communication device 50, from acceleration variation information recognized by an acceleration detection signal from the acceleration sensor 102, and performs communication opportunity determination using the estimated result. Subsequently, in the case of determining the communication opportunity, the control unit 101 performs control such that the standby radio waves in the dense state are generated in the short-range wireless communication unit (103 and 104). Moreover, in other cases than the case of determining the communication opportunity, the control unit 101 controls the generation of standby radio waves by the short-range wireless communication unit (103 and 104) to the rough state or the stopped state. When the above-mentioned portable telephone device, video camera device and mobile terminal device, and so on, include the configuration of this FIG. 14 in addition to components for the main functions, they correspond to the communication apparatus of the present disclosure.

The present technology may also be configured as below.

(1)

A communication apparatus including:

a short-range wireless communication unit that performs short-range wireless communication with an external communication device;

an acceleration sensor that detects an acceleration by a movement of a chassis; and a control unit that estimates whether the chassis approaches the external communication device, from acceleration variation information recognized by an acceleration detection signal from the acceleration sensor, performs a communication opportunity determination using a result of the estimation, controls the short-range wireless communication unit to generate a standby radio wave in a dense state in a case where a communication opportunity is determined, and controls generation of the standby radio wave by the short-range wireless communication unit to be in a rough state or a stopped state in a case other than the case of determining the communication opportunity.

(2)

The communication apparatus according to (1), wherein, in a case where the short-range wireless communication unit is controlled to generate the standby radio wave in the dense state by the determination of the communication opportunity and a predetermined time passes without establishment of communication with the external communication device, the control unit controls the generation of the standby radio wave by the short-range wireless communication unit to be in the rough state or the stopped state.

(3)

The communication apparatus according to (1) or (2), wherein, in a case where a positive-direction acceleration based on a mobile velocity enhancement and a negative-direction velocity to a movement stop of the chassis are generated as the acceleration variation information within a predetermined time, the control unit determines that the chassis approaches the external communication device.

(4)

The communication apparatus according to any one of (1) to (3), wherein the control unit recognizes three-dimensional acceleration direction information with further acceleration generation, from the acceleration detection signal acquired by the acceleration sensor, and wherein the control unit determines the communication opportunity in a case where the control unit estimates, from the acceleration variation information and the acceleration direction information, that the chassis approaches the external communication device in a specific acceleration direction state.

(5)

The communication apparatus according to (4), further including:

an announcement output unit, wherein, in the case where the control unit estimates, from the acceleration variation information and the acceleration direction information, that the chassis approaches the external communication device in the specific acceleration direction state, the control unit executes an announcement output from the announcement output unit according to a positional relationship between an antenna direction of the short-range wireless communication unit and the external communication device.

REFERENCE SIGNS LIST

1 DSC
2, 104 short-range wireless communication antenna
3 display unit
4 operation input unit
5 image capturing unit
6 image capturing signal processing unit
7 CPU
8 main memory
9 storage region
10, 103 short-range wireless communication controller
11 flash memories
12 speech output unit
20, 102 acceleration sensor
50 wireless communication device
51 short-range wireless communication antenna
100 communication apparatus
101 control unit

The invention claimed is:

1. A communication apparatus comprising:
a short-range wireless communication unit that performs short-range wireless communication with an external communication device;
an acceleration sensor that detects an acceleration by a movement of a chassis; and
a control unit that:
estimates whether the chassis approaches the external communication device, from acceleration variation information recognized by an acceleration detection signal from the acceleration sensor,
performs a communication opportunity determination using a result of the estimation,
controls the short-range wireless communication unit to generate a standby radio wave in a dense state in a case where a communication opportunity is determined,
wherein the communication opportunity is determined in a case where a positive-direction acceleration based on mobile velocity enhancement of the chassis and a negative-direction acceleration based on a movement stop of the chassis are generated as the acceleration variation information within a first predetermined time, and
controls generation of the standby radio wave by the short-range wireless communication unit to be in a rough state in a case other than the case where the communication opportunity is determined.

2. The communication apparatus according to claim 1, wherein, in a case where the short-range wireless communication unit is controlled to generate the standby radio wave in the dense state by the determination of the communication opportunity and a second predetermined time passes without establishment of communication with the external communication device, the control unit controls the generation of the standby radio wave by the short-range wireless communication unit to be in the rough state.

3. The communication apparatus according to claim 1,
wherein the control unit recognizes three-dimensional acceleration direction information with further acceleration generation, from the acceleration detection signal acquired by the acceleration sensor, and
wherein the control unit determines the communication opportunity in a case where the control unit estimates, from the acceleration variation information and the acceleration direction information, that the chassis approaches the external communication device in a specific acceleration direction state.

4. The communication apparatus according to claim 3, further comprising:
an announcement output unit,
wherein, in the case where the control unit estimates, from the acceleration variation information and the acceleration direction information, that the chassis approaches the external communication device in the specific acceleration direction state, the control unit executes an announcement output from the announcement output unit according to a positional relationship between an antenna direction of the short-range wireless communication unit and the external communication device.

5. The communication apparatus according to claim 1, wherein in the rough state a polling period of the standby radio wave is longer than the polling period of the standby radio wave in the dense state.

6. A communication control method of a communication apparatus including a short-range wireless communication unit that performs short-range wireless communication with an external communication device and an acceleration sensor that detects an acceleration by a movement of a chassis, the communication control method comprising:
- estimating whether the chassis approaches the external communication device, from acceleration variation information recognized by an acceleration detection signal from the acceleration sensor;
- performing a communication opportunity determination using a result of the estimation;
- generating a standby radio wave in a dense state from the short-range wireless communication unit in a case where a communication opportunity is determined, wherein the communication opportunity is determined in a case where a positive-direction acceleration based on mobile velocity enhancement of the chassis and a negative-direction acceleration based on a movement stop of the chassis are generated as the acceleration variation information within a first predetermined time; and
- setting generation of the standby radio wave by the short-range wireless communication unit in a rough state in a case other than the case where the communication opportunity is determined.

* * * * *